United States Patent
Thomassin et al.

(10) Patent No.: US 11,525,388 B2
(45) Date of Patent: Dec. 13, 2022

(54) ACTIVE CONTROL FLOW SYSTEM AND METHOD OF COOLING AND PROVIDING ACTIVE FLOW CONTROL

(71) Applicant: PRATT & WHITNEY CANADA CORP., Longueuil (CA)

(72) Inventors: Jean Thomassin, Sainte-Julie (CA); David Meisels, Montreal (CA); Richard Ullyott, St-Bruno (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 1019 days.

(21) Appl. No.: 16/210,465

(22) Filed: Dec. 5, 2018

(65) Prior Publication Data
US 2019/0107039 A1    Apr. 11, 2019

Related U.S. Application Data

(60) Division of application No. 15/134,904, filed on Apr. 21, 2016, now Pat. No. 10,174,665, which is a
(Continued)

(51) Int. Cl.
*F01P 11/10* (2006.01)
*B64C 9/38* (2006.01)
(Continued)

(52) U.S. Cl.
CPC .............. *F01P 11/10* (2013.01); *B64C 9/38* (2013.01); *B64C 21/04* (2013.01); *B64C 21/06* (2013.01);
(Continued)

(58) Field of Classification Search
CPC ..... F01P 11/10; F01P 3/20; F01P 5/10; B64C 9/38; B64C 21/04; B64C 21/06;
(Continued)

(56) References Cited

U.S. PATENT DOCUMENTS 3,018,987 A * 1/1962 Multhopp ................ B64C 9/38
244/52
3,093,349 A * 6/1963 Wagner ................ B64C 21/025
244/212
(Continued)

FOREIGN PATENT DOCUMENTS

CA    2897254 A1 *  3/2016  ........... B64C 21/025
DE    3339866        5/1985
(Continued)

OTHER PUBLICATIONS

Le Pape et al, Journal of the American Helicopter Society, Helicopter Fuselage Drag Reduction Using Active Flow Control: A Comprehensive Experimental Investigation, 2015, 032003-1 to 032003-12.

*Primary Examiner* — Valentina Xavier
(74) *Attorney, Agent, or Firm* — Norton Rose Fulbright Canada LLP (57) ABSTRACT

A method of providing active flow control for an aircraft includes cooling a liquid coolant in a heat exchanger by circulating a cooling airflow through the heat exchanger, and providing fluid communication between the cooling airflow and a boundary layer flow of at least one flight control surface of the aircraft. The cooling airflow affects the boundary layer flow of the flight control surface(s) to provide active flow control. A method of cooling an engine core of an engine assembly includes circulating a cooling fluid through the engine core, and cooling the cooling fluid with a cooling airflow used to provide active flow control to a flight control surface of the aircraft. An active flow control system for an aircraft is also discussed.

19 Claims, 6 Drawing Sheets

Related U.S. Application Data continuation-in-part of application No. 15/074,487, filed on Mar. 18, 2016, now abandoned.

(51) Int. Cl.

| | |
|---|---|
| *B64D 33/10* | (2006.01) |
| *B64C 21/04* | (2006.01) |
| *B64C 21/06* | (2006.01) |
| *B64D 27/10* | (2006.01) |
| *F01P 3/20* | (2006.01) |
| *F01P 5/10* | (2006.01) |
| *B64C 21/08* | (2006.01) |

(52) U.S. Cl.
CPC .............. *B64C 21/08* (2013.01); *B64D 27/10* (2013.01); *B64D 33/10* (2013.01); *F01P 3/20* (2013.01); *F01P 5/10* (2013.01); *B64C 2230/04* (2013.01); *B64C 2230/22* (2013.01); *Y02T 50/10* (2013.01); *Y02T 50/30* (2013.01); *Y02T 50/40* (2013.01)

(58) Field of Classification Search
CPC . B64C 21/08; B64C 2230/04; B64C 2230/22; B64D 27/10; B64D 33/10; Y02T 50/10; Y02T 50/30; Y02T 50/40
See application file for complete search history.

(56) References Cited

U.S. PATENT DOCUMENTS

| | | | |
|---|---|---|---|
| 4,214,722 A * | 7/1980 | Tamura | B64C 21/025 |
| | | | 244/208 |
| 4,830,312 A | 5/1989 | Hain et al. | |
| 5,143,329 A * | 9/1992 | Coffinberry | B64C 21/00 |
| | | | 244/209 |
| 6,698,687 B2 | 3/2004 | Daggett | |
| 7,611,093 B2 | 11/2009 | Campbell et al. | |
| 7,721,988 B2 | 5/2010 | Schiebel | |
| 11,072,423 B1 * | 7/2021 | Robertson | B64C 21/04 |
| 2003/0075120 A1 * | 4/2003 | Brace | F01P 9/00 |
| | | | 123/41.44 |
| 2006/0102801 A1 * | 5/2006 | Manley | B64C 21/04 |
| | | | 244/208 |
| 2007/0020099 A1 * | 1/2007 | Hutcheson | B64C 21/04 |
| | | | 416/90 R |
| 2010/0326049 A1 | 12/2010 | Schmittenberg et al. | |
| 2016/0069255 A1 | 3/2016 | Bolduc et al. | |
| 2016/0084165 A1 * | 3/2016 | Packard | B64C 21/04 |
| | | | 60/782 |
| 2016/0131036 A1 * | 5/2016 | Bintz | F01D 25/162 |
| | | | 60/779 |
| 2016/0298574 A1 * | 10/2016 | Sawyers-Abbott | B64C 21/06 |
| 2016/0332724 A1 * | 11/2016 | Mehring | B64D 33/10 |
| 2017/0082028 A1 * | 3/2017 | Duong | F02K 3/115 |
| 2018/0050810 A1 * | 2/2018 | Niergarth | F01D 15/12 |
| 2018/0050811 A1 * | 2/2018 | Niergarth | B64C 21/06 |
| 2018/0202362 A1 * | 7/2018 | Bintz | F02C 7/185 |
| 2018/0230908 A1 * | 8/2018 | Pesyna | B64D 29/00 |

FOREIGN PATENT DOCUMENTS

| | | | |
|---|---|---|---|
| DE | 102007019820 | 11/2008 | |
| DE | 202011100733 | 6/2011 | |
| EP | 2204568 | 7/2010 | |
| EP | 2204568 A2 * | 7/2010 | ............... B64C 7/02 |
| EP | 2998542 A1 * | 3/2016 | ........... B64C 21/025 |
| GB | 2308159 | 6/1997 | |
| WO | 20140197488 | 12/2014 | |
| WO | 20150042514 | 3/2015 | |
| WO | 20150183360 | 12/2015 | |

\* cited by examiner

ACTIVE CONTROL FLOW SYSTEM AND METHOD OF COOLING AND PROVIDING ACTIVE FLOW CONTROL

CROSS-REFERENCE TO RELATED APPLICATIONS

This application is a divisional of U.S. application Ser. No. 15/134,904, filed Apr. 21, 2016, which is a continuation-in-part of U.S. application Ser. No. 15/074,487 filed Mar. 18, 2016, the entire contents of which are incorporated by reference herein.

TECHNICAL FIELD

The application relates generally to active flow control in aircraft and, more particularly, to active flow control in aircraft surfaces such as flight control surfaces.

BACKGROUND OF THE ART

Known flow control surface boundary layer control systems include blown flaps, where a small amount of the compressed air produced by the aircraft engine is bled from the compressor and piped to channels running along the rear of the wing, where it is forced through slots in the wing flaps. Such injection of high energy air into the boundary layer may produce an increase in the stalling angle of attack and maximum lift coefficient by delaying the boundary layer separation from the airfoil.

Aircraft engine assemblies generally include heat exchanger(s) used to cool used cooling fluids. The cooling airflow circulated through such heat exchangers is typically taken from the environment of the engine assembly and exhausted back to the environment after circulation through the heat exchanger(s).

SUMMARY

In one aspect, there is provided a method of providing active flow control for an aircraft, the method comprising: cooling a component of the aircraft with a liquid coolant; circulating the used liquid coolant through a heat exchanger; cooling the liquid coolant in the heat exchanger by circulating a cooling airflow through the heat exchanger in heat exchange relationship with the liquid coolant; providing fluid communication between the cooling airflow and a boundary layer flow of at least one flight control surface of the aircraft, the cooling airflow affecting the boundary layer flow of the at least one flight control surface to provide active flow control.

In another aspect, there is provided a method of cooling an engine core of an engine assembly of an aircraft, the method comprising: circulating a cooling fluid through the engine core; cooling the cooling fluid in a heat exchanger through heat exchange with a cooling airflow; wherein the cooling airflow is used to provide active flow control to a surface of the aircraft.

In another aspect, there is provided an active flow control system for an aircraft, comprising: a flight control surface; a boundary layer control system in fluid communication with a boundary layer region of the flight control surface; a duct in fluid communication with the boundary layer control system; a heat exchanger having air passages in fluid communication with the duct and fluid passages in heat exchange relationship with the air passages, the fluid passages for receiving a cooling fluid of the aircraft; and a forced air driver in fluid communication with the duct for driving an airflow therethrough and through the boundary layer control system.

In a further aspect, there is provided an active flow control system for an aircraft, comprising: a boundary layer control system in fluid communication with a surface in a low pressure recovery area of the aircraft; a duct in fluid communication with the boundary layer control system; a heat exchanger having air passages in fluid communication with the duct and fluid passages in heat exchange relationship with the air passages, the fluid passages for receiving a cooling fluid of the aircraft; and a forced air driver in fluid communication with the duct for driving an airflow therethrough and through the boundary layer control system.

DESCRIPTION OF THE DRAWINGS

Reference is now made to the accompanying figures in which.

DETAILED DESCRIPTION

Figure 1:
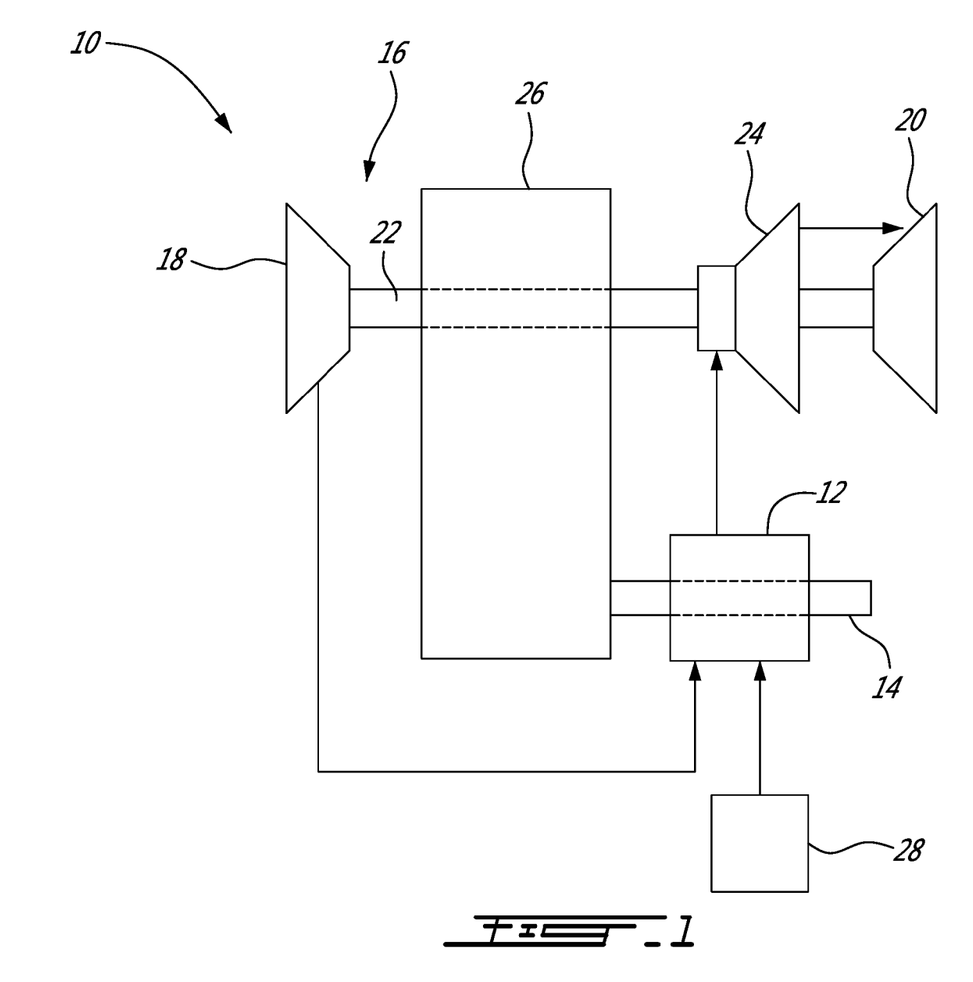
FIG. 1 is a schematic representation of a compound engine assembly according to a particular embodiment.

Referring to FIG. 1, a compound engine assembly 10 is schematically shown. The engine assembly 10 includes an engine core 12 with one or more intermittent combustion internal combustion engine(s). The internal combustion engine(s) of the core 12 drive a common load. In the embodiment shown, the common load includes an output shaft 14 which may be for example connected to a propeller through a reduction gearbox (not shown) and to which each internal combustion engine is engaged. Other possible common loads may include, but are not limited to, one or more compressor and/or fan rotor(s), electrical generator(s), accessories, rotor mast(s), or any other type of load or combination thereof. Accordingly, the engine assembly 10 may be used for example as a turboshaft engine, a turboprop engine, or an auxiliary power unit (APU).

In the embodiment shown, the engine assembly 10 also includes a turbocharger 16, including a compressor 18 and a second stage turbine 20 which are drivingly interconnected by a shaft 22. The compressor 18 and the second stage turbine 20 may each be a single-stage device or a multiple-stage device with a single shaft or split on multiple independent shafts in parallel or in series, and may each be a centrifugal or axial device. The compressor 18 of the turbocharger 16 compresses the air before it enters the engine(s) of the engine core 12. The compressor 18 and the second stage turbine 20 may each include one or more rotors, with radial, axial or mixed flow blades.

In the embodiment shown, the shaft 22 of the turbocharger 16 extends along a different axis than that of the output shaft 14, for example parallel thereto; alternately, the shaft 22 of the turbocharger may extend transverse to the output shaft 14, or may be defined coaxially with the output shaft 14. The turbocharger shaft 22 and output shaft 14 are in driving engagement with one another, through any suitable type of transmission or gearbox 26, for example a planetary, star, offset or angular gear system.

Each internal combustion engine provides an exhaust flow in the form of exhaust pulses. The exhaust flow of each internal combustion engine of the core 12 is supplied to a compound or first stage turbine 24 in fluid communication therewith. The first stage turbine 24 could be an axial, radial or mixed flow turbine. In the embodiment shown, the first stage turbine 24 is drivingly interconnected to the second stage turbine 20 by being mounted to the same turbine shaft 22, and accordingly also drivingly engaged to the output shaft 14 through the gearbox 26. In an alternate embodiment, the turbines 24, 20 may rotate independently, with the first stage turbine 24 drivingly engaged to the output shaft 14, for example via the gearbox 26, and the second stage turbine 26 drivingly engaged to the compressor 18, for example via the turbine shaft 22.

The outlet of the first stage turbine 24 is in fluid communication with an inlet of the second stage turbine 20. Energy is extracted from the exhaust gas exiting the first stage turbine 24 by the second stage turbine 20 to drive the compressor 18 via the connecting shaft 22. In a particular embodiment, the second stage turbine 20 has a higher reaction ratio than the first stage turbine 24.

It is understood that the particular configuration for the engine assembly 10 shown is provided as an example only, and that the configuration may vary; various possible configurations include, but are not limited to, more or less turbines, the compressor being omitted, and/or the engine core and turbine(s) rotating independently from one another (i.e. not compounded).

The fuel injector(s) of each engine of the core 12, which in a particular embodiment are common rail fuel injectors, communicate with a source 30 of heavy fuel (e.g. diesel, kerosene (jet fuel), equivalent biofuel), and deliver the heavy fuel into the core engine(s) 12 such that the combustion chamber is stratified with a rich fuel-air mixture near the ignition source and a leaner mixture elsewhere.

Although not shown in FIG. 1, the air may circulate through an intercooler between the compressor 20 and the engine core 12, and the engine assembly 10 also includes a cooling system including a heat exchanger 28 (see FIG. 3) to cool a cooling fluid circulating through the engine core 12. In a particular embodiment, the cooling fluid is an appropriate liquid coolant, for example water. The airflow through the heat exchanger of the engine assembly 10 is used for active flow control of the aircraft, as will be further detailed below.

Figure 2:
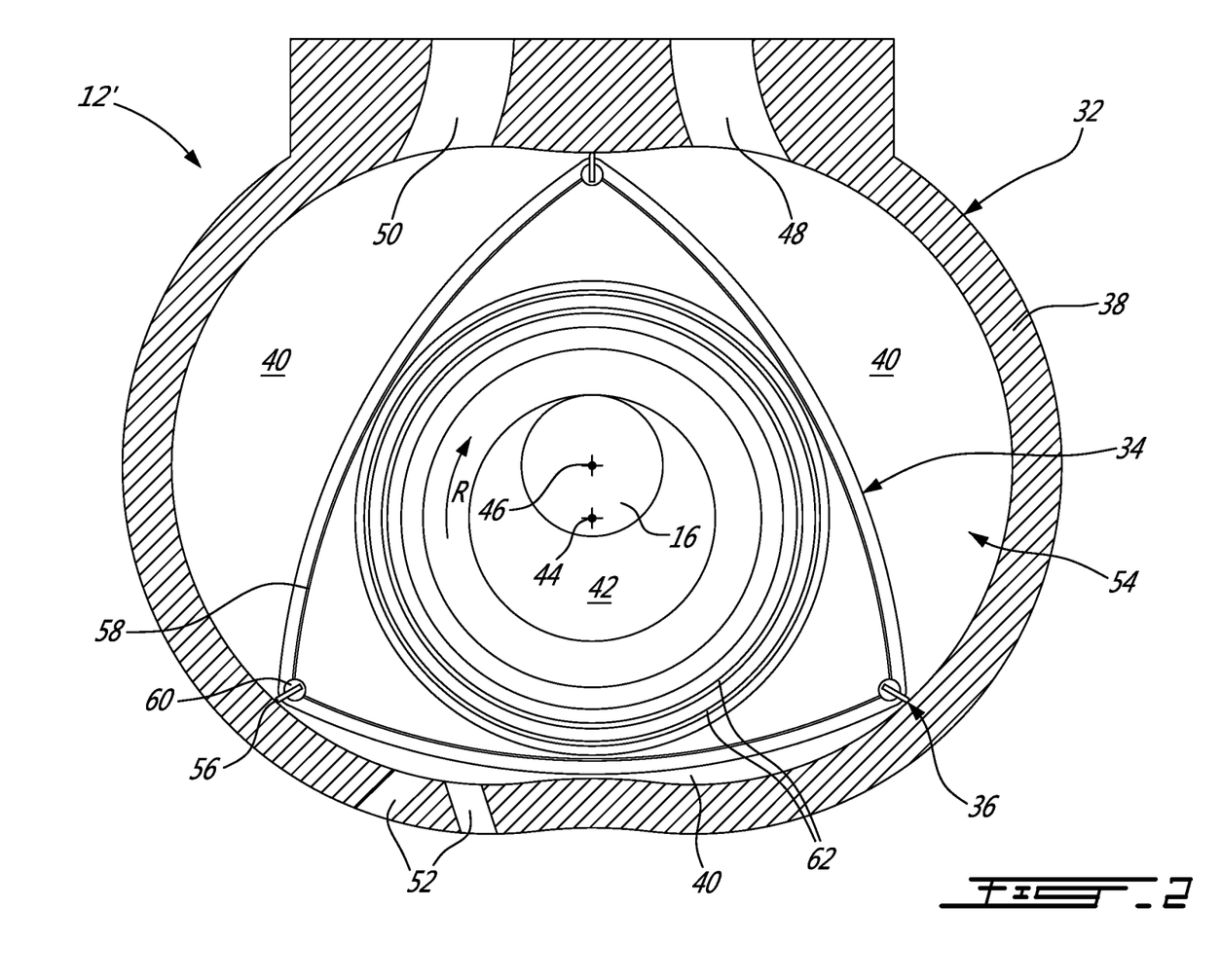
FIG. 2 is a schematic cross-sectional view of a Wankel engine which can be used in a compound engine assembly such as shown in FIG. 1, according to a particular embodiment.

In a particular embodiment, the engine core 12 includes two (2) core engines, each being a rotary internal combustion engine having a rotor sealingly engaged in a respective housing, for example a Wankel rotary engine. Referring to FIG. 2, an exemplary embodiment of a Wankel engine 12' is shown; it is understood that the configuration of the core engine(s) used in the engine assembly 10, e.g. placement of ports, number and placement of seals, etc., may vary from that of the embodiment shown. In addition, it is understood that each core engine may be any other type of internal combustion engine including, but not limited to, any other type of rotary engine, and any other type of internal combustion engine (e.g. reciprocating engine). More or less core engines may be provided; as non-limiting examples, in other particular embodiments, the engine core includes a single Wankel engine, or four (4) Wankel engines, or any suitable number of internal combustion engines having any other suitable configuration (e.g. reciprocating engine).

As shown in FIG. 2, each Wankel engine comprises a housing 32 defining an internal cavity with a profile defining two lobes, which is preferably an epitrochoid. A rotor 34 is received within the internal cavity. The rotor defines three circumferentially-spaced apex portions 36, and a generally triangular profile with outwardly arched sides. The apex portions 36 are in sealing engagement with the inner surface of a peripheral wall 38 of the housing 32 to form three working chambers 40 between the rotor 34 and the housing 32.

The rotor 34 is engaged to an eccentric portion 42 of the output shaft 16 to perform orbital revolutions within the internal cavity. The output shaft 16 performs three rotations for each orbital revolution of the rotor 34. The geometrical axis 44 of the rotor 34 is offset from and parallel to the axis 46 of the housing 32. During each orbital revolution, each chamber 40 varies in volume and moves around the internal cavity to undergo the four phases of intake, compression, expansion and exhaust.

An intake port 48 is provided through the peripheral wall 38 for successively admitting compressed air from the inlet manifold 18 into each working chamber 40. An exhaust port 50 is also provided through the peripheral wall 38 for successively discharging the exhaust gases from each working chamber 40. Passages 52 for a glow plug, spark plug or other ignition element, as well as for one or more fuel injectors (not shown) are also provided through the peripheral wall 38. Alternately, the intake port 48, the exhaust port 50 and/or the passages 52 may be provided through an end or side wall 54 of the housing; and/or, the ignition element and a pilot fuel injector may communicate with a pilot subchamber (not shown) defined in the housing 32 and communicating with the internal cavity for providing a pilot injection. The pilot subchamber may be for example defined in an insert (not shown) received in the peripheral wall 38.

For efficient operation the working chambers 40 are sealed, for example by spring-loaded apex seals 56 extending from the rotor 34 to engage the peripheral wall 38, and spring-loaded face or gas seals 58 and end or corner seals 60 extending from the rotor 34 to engage the end walls 54. The rotor 34 also includes at least one spring-loaded oil seal ring 62 biased against the end wall 54 around the bearing for the rotor 34 on the shaft eccentric portion 42.

Each Wankel engine provides an exhaust flow in the form of a relatively long exhaust pulse; for example, in a particular embodiment, each Wankel engine has one explosion per 360° of rotation of the output shaft, with the exhaust port remaining open for about 270° of that rotation.

In a particular embodiment which may be particularly but not exclusively suitable for low altitude, each Wankel engine has a volumetric expansion ratio of from 5 to 9, and a volumetric compression ratio lower than the volumetric expansion ratio. The power recovery of the first stage turbine 26 may be maximized by having the exhaust gas temperatures at the material limit, and as such is suitable for such relatively low volumetric compression ratios, which may help increase the power density of the Wankel engine and may also improve combustion at high speed and of heavy fuel.

Figure 3:
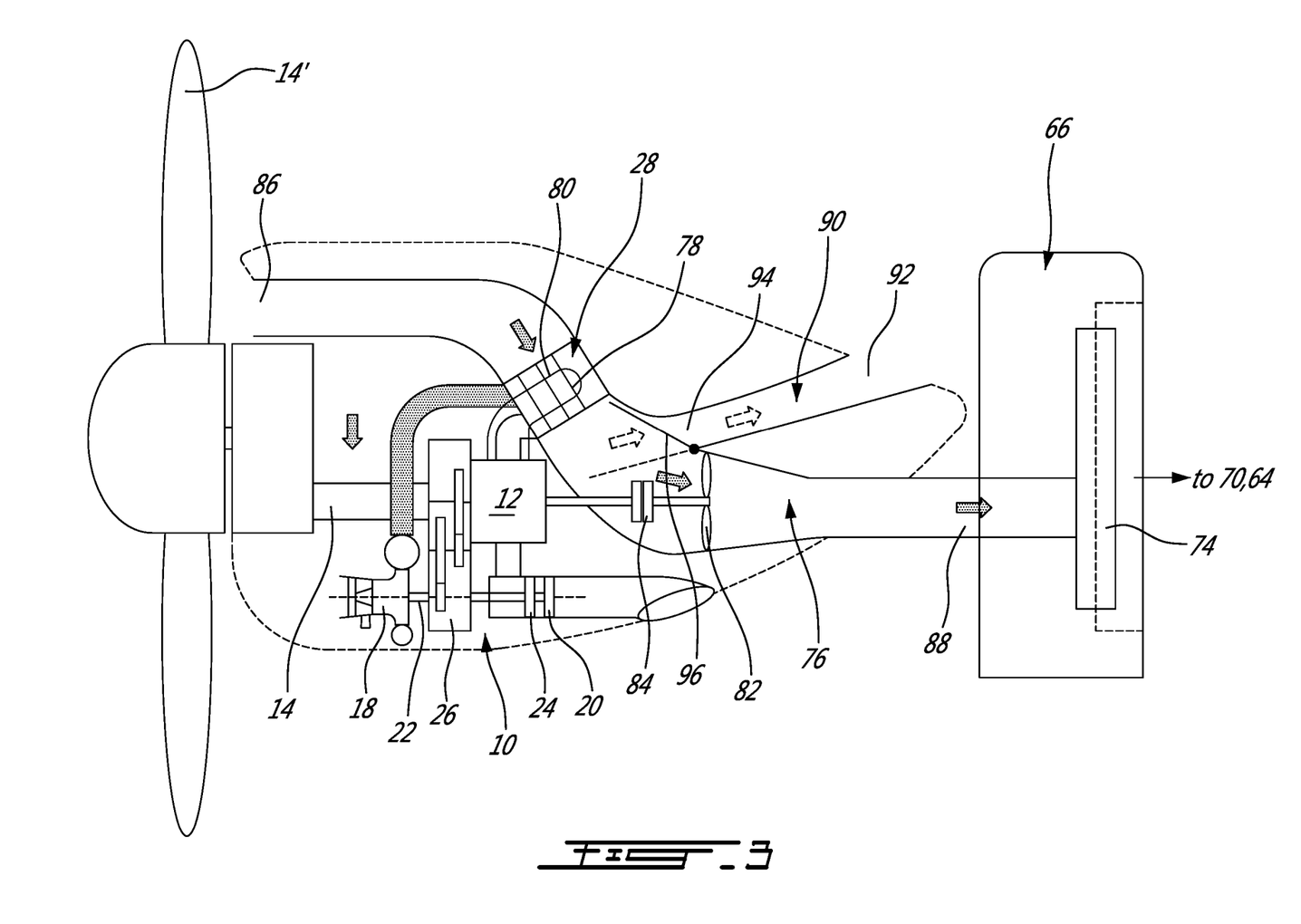
FIG. 3 is a schematic cross-sectional view of a compound engine assembly such as shown in FIG. 1, used in combination with an active flow control system according to a particular embodiment.

Referring to FIG. 3 and as mentioned above, in the embodiment shown the airflow through the heat exchanger 28 of the engine assembly 10 is used to apply active flow control to one or more flight control surface(s) of the aircraft. It is understood that the term "aircraft" includes fixed wing aircraft and rotorcraft, and that the term "flight control surface" include any movable aircraft surface that allow a pilot to adjust and control the aircraft's flight attitude, including, but not limited to, ailerons, elevators, rudders, elevons (combining the functions of elevators and ailerons), spoilers, spoilerons, flaps, slats, and air brakes.

Figure 4:
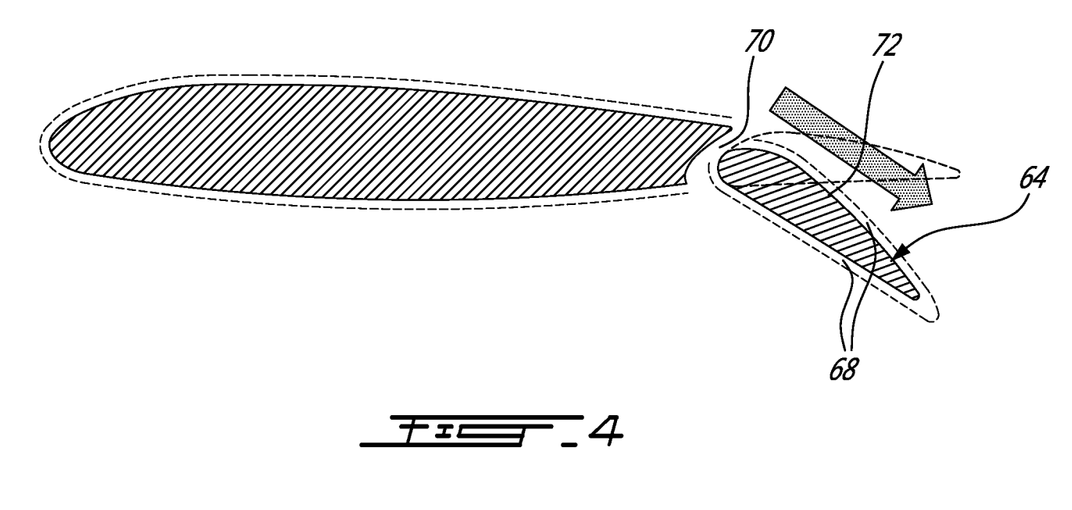
FIG. 4 is a schematic cross-sectional view of a flight control surface according to a particular embodiment, which may be used with the active flow control system of FIG. 3.

An active flow control system thus generally includes one or more flight control surface(s) 64 (an example of which is shown in FIG. 4) and a boundary layer control system 66 in fluid communication with a boundary layer region 68 (FIG. 4) of the flight control surface(s) 64. The boundary layer control system 66 either provides an additional flow to the boundary layer flow (blowing system) or provide suction to extract part of the boundary layer flow (suction system).

Referring to FIG. 4, an example of a flight control surface 64 is shown, which in this particular embodiment is a flap. The boundary layer control system 66 includes one or more nozzles 70 directing airflow along an upper surface 72 of the flap, for example tangentially to the upper surface 72, such that the flap has a "blown flap" configuration, which may be used for example in a short takeoff and landing (STOL) aircraft. Each nozzle 70 may be provided as an internal conduit in the wing terminating in a slot on the upper surface 72 of the flap near its trailing edge. Other configurations may alternately be used. For example, the nozzles 70 can direct the airflow along the lower surface of the flap, for example with the nozzles located near the leading edge and directed tangentially along the forward direction. In the case of a vertical control surface, either or both sides of the control surface may include nozzles, for example to enhance yaw control at low speeds, which in particular embodiments may allow the control surface to be smaller and/or to have reduced drag. Nozzles on opposed sides of a horizontal control surface may also be provided, for example to increase control capability.

In a particular embodiment, the "blown flaps" provides for a relatively low stall speed, for example reduced by a factor of 2 or more with respect to the same aircraft without active flow control. The boundary layer control system 66 energizes the boundary layer in appropriate locations on the wing and allow the wing to provide lift down to very low speed (for example, STOL operations).

Referring back to FIG. 3, the boundary layer control system 66 includes one or more conduits and/or plenums 74 for directing flow to or from the flight control surface(s) 64. The conduit(s) and/or plenums 74 are in fluid communication with a duct 76, which is in fluid communication with air passages 78 of the heat exchanger 28 of the engine assembly 10. In the embodiment shown, the heat exchanger 28 is contained in the duct 76. The heat exchanger 28 includes fluid passages 80 in heat exchange relationship with the air passages 78. The fluid passages 80 receive the cooling fluid (e.g. liquid coolant) circulating out of the engine core 12, which is cooled by the heat exchanger 28 for recirculation to the engine core 12.

A forced air driver, which in the embodiment shown is a rotatable fan 82 (e.g. blower), is in fluid communication with the duct 76 for driving the airflow therethrough. It is understood that any other suitable mechanism for forcing a flow of air through the duct 76 may alternately be used, including, but not limited to, one or more ejector(s). In the embodiment shown, the fan 82 is directly received in the duct 76, and is driven by the engine core 12 of the engine assembly 10, through a suitable transmission including a clutch 84 to allow the fan 82 to be rotated as required. In a particular embodiment, the heat exchanger 28 is sized to operate without the fan 82 at high speed (high ram conditions), and the fan 82 is engaged to rotate only at low speed, when ram conditions are not sufficient to provide the required airflow through the heat exchanger 28. Other configurations and/or drive mechanisms are also possible, including continuously engaged drive mechanisms (i.e. without a clutch) to actuate the fan 82 even in high speed conditions (potentially allowing for a smaller heat exchanger to be used) and/or any appropriate type of mechanical, electrical or hydraulic drive.

In the embodiment shown, the duct 76 has an inlet 86 communicating with an environment of the engine assembly 10 and an outlet 88 communicating with the boundary layer control system 66. The boundary layer control system 66 is thus located downstream of the heat exchanger 28, so that the fan 82 drives the airflow from the environment, through the heat exchanger 28, then to the boundary layer control system 66.

Accordingly, the engine core 12 of the engine assembly 10 is cooled by circulating the cooling fluid (e.g. liquid coolant) through the engine core 12, for example through cooling passages defined through the housing 32 of each rotary internal combustion engine and in fluid communication with the fluid passages 80 of the heat exchanger 28. The cooling fluid is then cooled in the heat exchanger 28 through heat exchange with the cooling airflow in the duct 76. The cooling airflow is used to provide the active flow control to the flight control surface(s) 64. In this embodiment, the cooling airflow is used to provide the active flow control by circulating the cooling airflow from the heat exchanger 28 to the boundary layer region 68 of the flight control surface(s) 64. Alternately, the cooling airflow may be used to provide the active flow control by circulating the cooling airflow from the boundary layer region 68 of the flight control surface(s) to the heat exchanger 28, as will be further detailed below.

In the embodiment shown, the heat exchanger 28 also includes or acts as an intercooler. The compressed flow from the compressor 18 of the engine assembly is thus circulated through the heat exchanger 28 before being circulated to the engine core 12.

In the embodiment shown in FIG. 3, the engine assembly 10 is a prime mover engine, i.e. an engine providing propulsion to the aircraft; the load 14 includes a propeller 14'. It is understood that a similar configuration may be used for other types of prime mover engines (e.g. turboshaft) as well as engines used as auxiliary power units.

Still referring to FIG. 3, in the embodiment shown, an exhaust conduit 90 has an outlet 92 communicating with the environment of the engine assembly 10, and an inlet 94 communicating with the duct 76 downstream of the heat exchanger 28 and upstream of the boundary layer control system 66. A valve 96 selectively blocks the fluid communication between the duct 76 and the exhaust conduit 90. The exhaust conduit 90 provides a bypass when the airflow circulating through the heat exchanger 28 exceeds the requirements of the boundary layer control system 66; the excess flow is diverted through the exhaust conduit 90 through selective opening of the valve 96. The valve 96 may have a variable opening to modulate the flow directed through the exhaust conduit 90. In the embodiment shown, the valve 96 is provided in the form of a pivotable door, pivotable between closed and completely opened positions. Other configurations are also possible.

Figure 5:
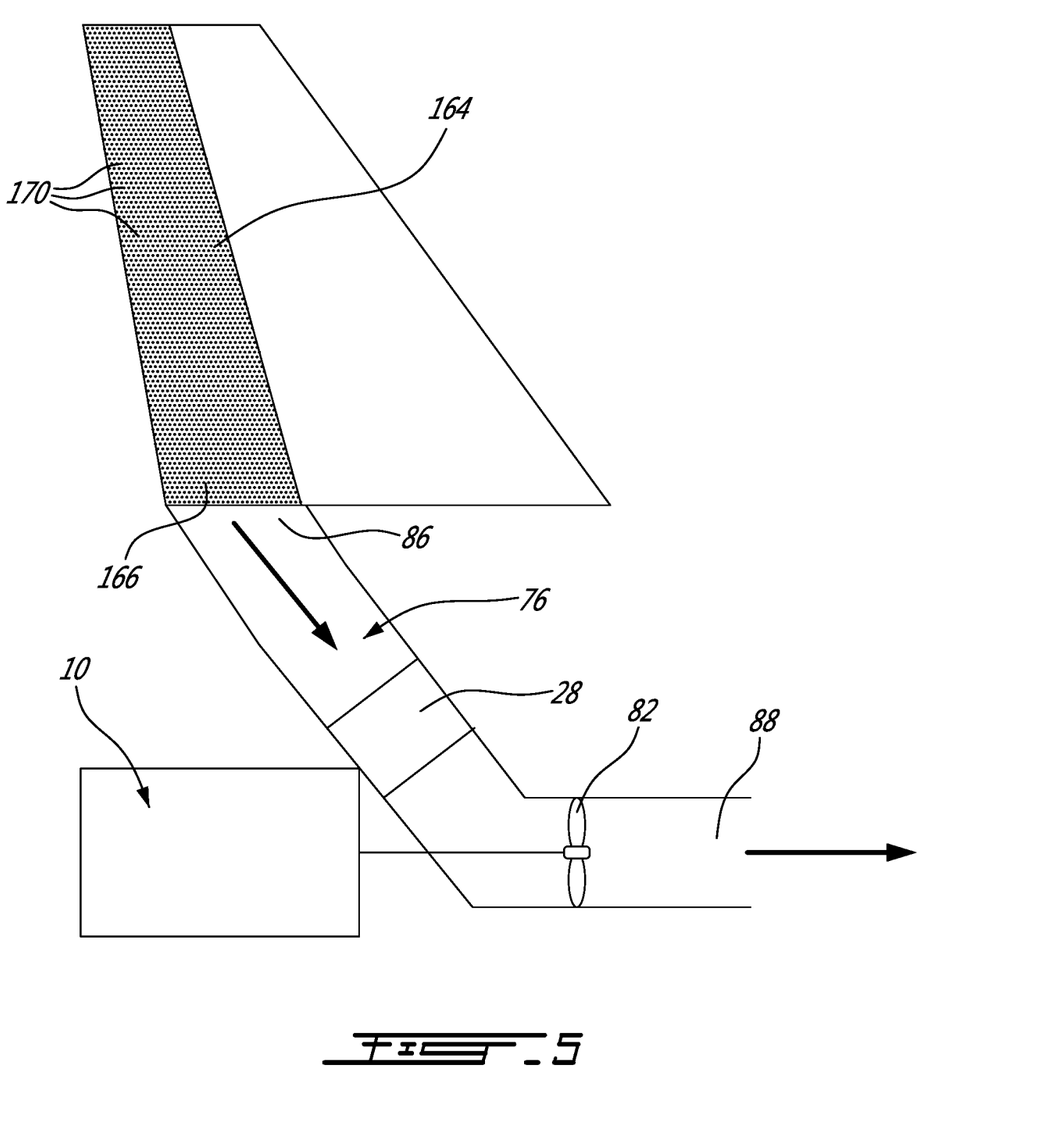
FIG. 5 is a schematic cross-sectional view of an engine assembly which may be a compound engine assembly such as shown in FIG. 1, used in combination with an active flow control system according to another particular embodiment.

Referring to FIG. 5, in another embodiment the flight control surface(s) 164 include an aileron provided on the tail of the aircraft. The boundary layer control system 166 is a suction system, including a plurality of openings 170 defined through any surface of the aileron 164 where suction helps to maintain boundary layer control; the openings 170 are in fluid communication with a portion of the duct 76 extending upstream of the heat exchanger 28. For example, the openings 170 may be defined by having part of the flight control surface 164 made of porous material, with the openings 170 of the porous material communicating with one or more plenum(s) defined in the flight control surface 164 and communicating with the duct 76. Other configurations are also possible.

In this embodiment, the heat exchanger 28 is also contained in the duct 76, and the fan 82 is also driven by the engine assembly 10, for example by the engine core 12. The inlet 86 of the duct 76 communicates with the boundary layer control system 166 and the outlet 88 of the duct 76 communicates with the environment of the engine assembly 10. The boundary layer control system 166 is thus located upstream of the heat exchanger 28, so that the fan 82 drives the airflow from the boundary layer control system 166, through the heat exchanger 28, then to the environment of the engine assembly 10.

Although not shown, an exhaust conduit may be provided with an outlet communicating with the environment of the engine assembly 10, and an inlet communicating with the duct 76 downstream of the boundary layer control system 166 and upstream of the heat exchanger 28, and with a valve selectively blocking the fluid communication between the duct 76 and the exhaust conduit, to provides a bypass when the airflow from the boundary layer control system 166 exceeds the requirements of the heat exchanger 28.

In a particular embodiment, the suction type boundary later control system 166 may be more efficient to re-attach the boundary layer at high aerodynamic load, which may reduce the amount of fuel required to operate the engine assembly 10.

In an alternate embodiment, the suction type boundary layer control system 166 uses active flow control to improve boundary layer control and/or reduce drag in a part, e.g. static part, of the aircraft (fixed wing, rotorcraft, etc.), for example where to improve ram recovery and/or low pressure recovery. The openings 170 are defined through any surface of the part where suction helps reduce improve boundary layer control and/or reduce drag (e.g. form drag), with the openings being in communicating with the duct 76 to provide the flow to the heat exchanger 28.

Figure 6:
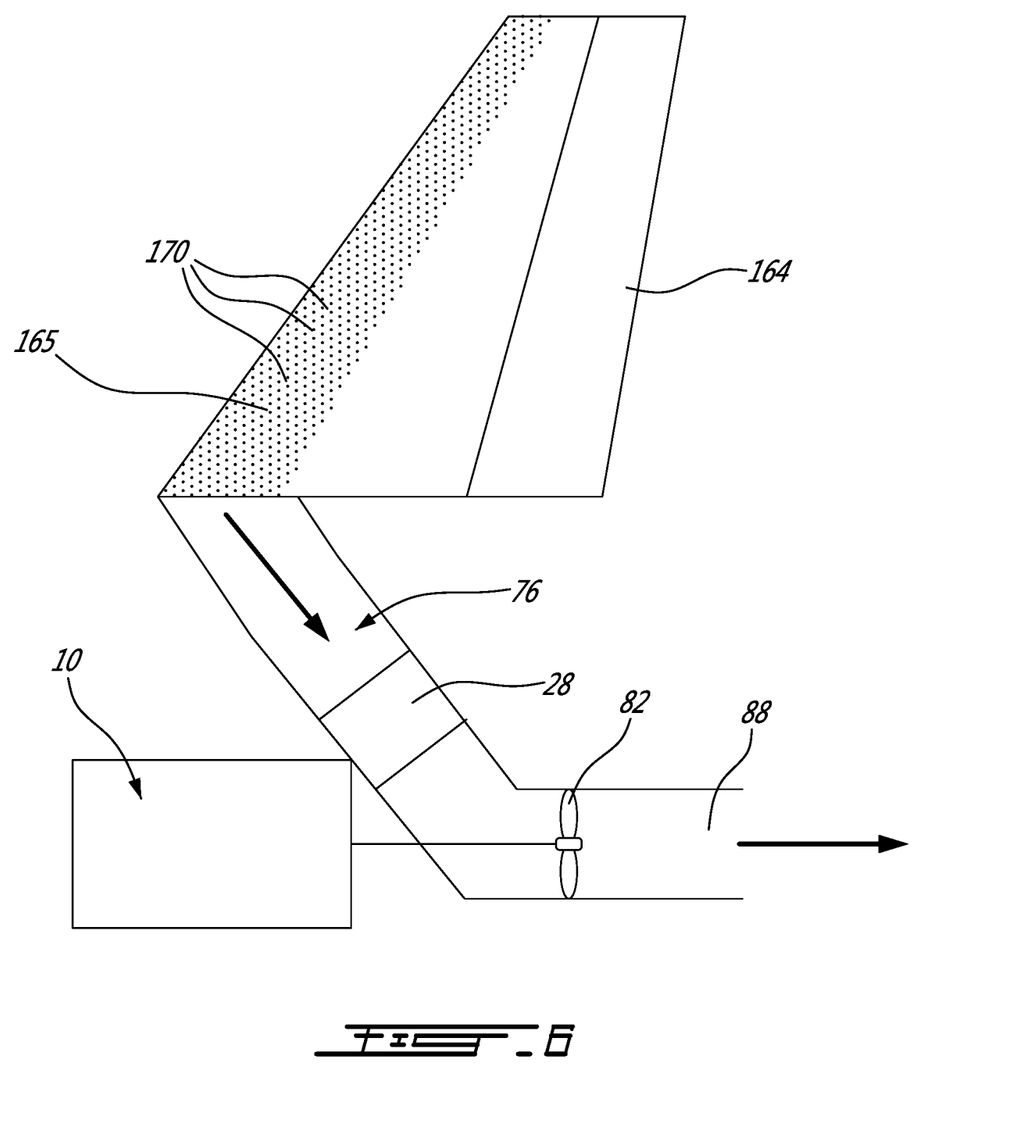
FIG. 6 is a schematic cross-sectional view of an engine assembly which may be a compound engine assembly such as shown in FIG. 1, used in combination with an active flow control system according to another particular embodiment.

For example, in a particular embodiment shown in FIG. 6, the suction type boundary layer control system 166 includes openings 170 provided in a leading edge region 165 of the tail of the aircraft, which in the embodiment shown is defined as the region extending from, in proximity of and including the leading edge of the tail; the leading edge region 165 is a region where suction may help to improve boundary layer control and/or reduce drag. Similarly to the embodiment of FIG. 5, the openings 170 are in fluid communication with a portion of the duct 76 extending upstream of the heat exchanger 28. For example, the openings 170 may be defined by having part of leading edge region 165 made of porous material, with the openings 170 of the porous material communicating with one or more plenum(s) defined in tail and communicating with the duct 76. Other configurations are also possible.

Alternately, the openings may be provided in any location where there is low pressure recovery, including, but not limited to, the leading edge region of any airfoil (wing, tail, control surface, etc.), and any surface in a low pressure recovery area around the wings, fuselage, tail cone, vertical stabilizers, horizontal stabilizers, and/or around other flight control surfaces. The boundary layer control system used with low pressure recovery areas could be a system providing an additional flow to the boundary layer flow in these areas (blowing system) or providing suction to extract part of the boundary layer flow (suction system), as described above.

In the embodiments shown in FIGS. 5-6, the engine assembly 10 is an auxiliary power unit. It is understood that a similar configuration may be used for any type of prime mover engine. In a particular embodiment, the engine assembly 10 is a prime mover engine, and the boundary layer control system communicates with one or more surfaces of the aircraft where there is low pressure recovery; the surfaces may be control surfaces, or other surfaces (e.g. fixed surfaces) such as detailed above.

Although in the embodiments shown the fan 82 is located downstream of the heat exchanger 28, it is understood that alternately the fan 82 may be located upstream of the heat exchanger 28.

The cooling systems of engine assemblies such as the assembly 10 shown typically require a large amount of forced cooling air to operate, thus requiring a relatively high flow at relative low temperatures through the duct 76; in a particular embodiment, such flow is particularly suitable for use with large aircraft active flow control requirements. For example, engine assemblies with engine cores 12 including one or more rotary engine(s) may have comparatively high cooling air mass flow, although the core engine mass flow is low, as compared to a gas turbine engine with a combustor. In a particular embodiment, high cooling flow is still provided down to very low engine speed, which allows to energize the flight control surface aerodynamics, for example to reduce stall speed.

In a particular embodiment, the active control system may allow to reduce the size of the flight control surface(s) 64, 164 to which it is applied, by using high pressure air which is required for cooling of the engine assembly 20 and which otherwise would be waste air; the system also removes the need for a dedicated fan to provide the airflow of the boundary layer control system 66, 166. The boundary layer control system 66, 166 may allow to energize the boundary layer of the flight control surface(s) 64, 164 and improve their efficiency, for example at high aerodynamic loading.

In a particular embodiment, the airflow generated by the compressor 18 of the engine assembly 10 may be too hot to be used directly in a boundary layer control system 66, 166, particularly for an auxiliary power unit operated in a low thermal efficiency and high fuel consumption configuration, where boundary layer control may be more useful or required. Accordingly, the use of the cooling air flow from or to the heat exchanger 28 in the boundary layer control system 66, 166 instead of the airflow generated by the compressor 18 of the engine assembly 10 may allow to avoid the need for an additional heat exchanger, and/or may allow for a reduction of additional fuel burn resulting from the active control system.

In a particular embodiment and when used with a prime mover engine for a fixed wing aircraft, the inclusion of the fan 82 may allow for the use of a smaller cooling fluid heat exchanger, as compared to heat exchangers which are sized to rely only on ram air; for example the heat exchanger 28 may be sized for cruise conditions as opposed to take-off conditions. The presence of the active control system may thus allow for a weight reduction and/or size reduction of the engine assembly 10, through the use of a smaller heat exchanger.

In use, the active flow control for the aircraft can thus be provided by cooling a component of the aircraft, such as the engine core 12, with a cooling fluid such as a liquid coolant, then circulating the used liquid coolant through the heat exchanger 28, where the liquid coolant is cooled by the cooling airflow through the duct 76. Fluid communication is provided between the cooling airflow and the boundary layer flow of aircraft surfaces such as surfaces in low pressure recovery area(s) and/or flight control surface(s) 64, 164; the cooling airflow thus affects the boundary layer flow of the surface(s) to provide the active flow control. Depending on the configuration of the active control system 66, 166, the fluid communication between the cooling airflow and the boundary layer flow may be provided upstream or downstream of the heat exchanger 28; the cooling airflow may thus be extracted from (e.g. through openings in a surface of the flight control surface 64, 164) or added to (e.g. by directing jets along a surface of the flight control surface 64, 164) the boundary layer flow.

The cooling airflow is typically circulated by rotating the fan 82, although under high speed conditions ram pressure may be sufficient to provide the desired airflow circulation, particularly for boundary layer control systems 66, 166 of the blowing type.

In the embodiments shown, the liquid coolant is circulated through a housing 32 of the internal combustion engine (e.g. rotary engine) of the engine assembly 10. It is however understood that the heat exchanger 28 could be used to cool other components of the engine assembly 10 and/or of the aircraft, including, but not limited to, supercool bearings in an electric motor, electrical components, batteries, etc., in combination or in replacement of the engine core 12 of the engine assembly 10. Accordingly, the active control system could use the cooling airflow or any other type of heat exchanger, including, but not limited to, any type of heat exchanger used to cool liquid coolant.

It is understood that the airflow generated by the fan 82 in duct 76 may additionally be used for other purposes. For example, in cases where the airflow is sufficiently heated in the heat exchanger 28, part of the airflow can be extracted from the duct 76 or from the active control system 66, 166 for anti-icing purposes.

The above description is meant to be exemplary only, and one skilled in the art will recognize that changes may be made to the embodiments described without departing from the scope of the invention disclosed. Modifications other than those explicitly mentioned herein which fall within the scope of the present invention will be apparent to those skilled in the art, in light of a review of this disclosure, and such modifications are intended to fall within the appended claims.

The invention claimed is:

1. An active flow control system for an aircraft, comprising:
   a flight control surface being movable for controlling the aircraft;
   a boundary layer control system in fluid communication with a boundary layer region of the flight control surface, the flight control surface movable relative to the boundary layer control system;
   a duct in fluid communication with the boundary layer control system;
   a heat exchanger having air passages in fluid communication with the duct and fluid passages in heat exchange relationship with the air passages, the fluid passages for receiving a cooling fluid of the aircraft; and
   a forced air driver in fluid communication with the duct for driving an airflow therethrough and through the boundary layer control system.

2. The system as defined in claim 1, wherein the boundary layer control system includes a plurality of openings defined through the flight control surface in fluid communication with a portion of the duct extending upstream of the heat exchanger.

3. The system as defined in claim 1, wherein the boundary layer control system includes a plurality of nozzles oriented to direct a flow on a surface of the flight control surface, the nozzles in fluid communication with a portion of the duct extending downstream of the heat exchanger.

4. The system as defined in claim 1, further comprising an exhaust conduit communicating with the duct between the heat exchanger and the boundary layer control system, and a valve modulating the communication between the exhaust conduit and the duct.

5. The system as defined in claim 1, wherein the fluid passages of the heat exchanger are configured to receive a liquid coolant.

6. An assembly comprising an engine core including at least one rotary internal combustion engine and the system as defined in claim 1, each rotary internal combustion engine having a housing including cooling passages in fluid communication with the fluid passages of the heat exchanger.

7. An active flow control system for an aircraft, comprising:
   a boundary layer control system in fluid communication with a surface in a low pressure recovery area of the aircraft;
   a duct in fluid communication with the boundary layer control system;
   a heat exchanger having air passages in fluid communication with the duct and fluid passages in heat exchange relationship with the air passages, the fluid passages for receiving a cooling fluid of the aircraft;
   a forced air driver in fluid communication with the duct for driving an airflow therethrough and through the boundary layer control system;
   an exhaust conduit having an exhaust conduit inlet communicating with the duct between the heat exchanger and the boundary layer control system and an exhaust conduit outlet communicating with an environment outside the aircraft, the exhaust conduit outlet distinct from an outlet of the duct; and
   a valve modulating the communication between the exhaust conduit and the duct, the valve having a closed configuration in which the exhaust conduit inlet is disconnected from the duct and an open configuration in which the duct is fluidly connected to the exhaust conduit outlet and in which a portion of the airflow flows through the duct and through the exhaust conduit thereby bypassing the boundary layer control system.

8. The system as defined in claim 7, wherein the low pressure recovery area includes a leading edge region extending from a leading edge of an airfoil.

9. The system as defined in claim 8, wherein the airfoil is an airfoil of a wing of the aircraft, a tail of the aircraft and/or a control surface of the aircraft.

10. The system as defined in claim 7, wherein the boundary layer control system includes a plurality of openings defined through the surface in fluid communication with a portion of the duct extending upstream of the heat exchanger.

11. The system as defined in claim 7, wherein the boundary layer control system includes a plurality of nozzles oriented to direct a flow on the surface, the nozzles in fluid communication with a portion of the duct extending downstream of the heat exchanger.

12. The system as defined in claim 7, wherein the fluid passages of the heat exchanger are configured to receive a liquid coolant.

13. The system as defined in claim 7, wherein the forced air driver is a fan rotating within the duct.

14. The system as defined in claim 1, wherein the forced air driver is a fan rotating within the duct.

15. The system as defined in claim 13, wherein the fan is located downstream of the heat exchanger.

16. The system as defined in claim 14, wherein the fan is located downstream of the heat exchanger.

17. An assembly for an aircraft comprising: an intermittent internal combustion engine being liquid cooled and having at least one cooling passage; a heat exchanger having at least one air passage and at least one fluid passage, the at least one fluid passage fluidly connected to the at least one cooling passage of the intermittent internal combustion engine; a duct fluidly connected to a boundary layer region of a surface of the aircraft, the duct fluidly connected to the at least one air passage of the heat exchanger, the duct having an inlet in fluid flow communication with an environment outside the aircraft and an outlet in fluid flow communication with the boundary layer region of the aircraft for injecting air into the boundary layer region; and a forced air driver in fluid communication with the duct for driving an airflow therethrough and from the boundary layer region of the aircraft.

18. The assembly as defined in claim 17, wherein the duct is fluidly connected to the boundary layer region via a plurality of openings defined through the surface of the aircraft.

19. The assembly as defined in claim 17, further comprising a plurality of nozzles oriented to direct a flow on the surface of the aircraft, the nozzles in fluid communication with a portion of the duct extending downstream of the heat exchanger.

\* \* \* \* \*